July 16, 1968    R. M. PIERCE    3,392,950
ADJUSTABLE MIRROR ASSEMBLY
Filed June 27, 1966
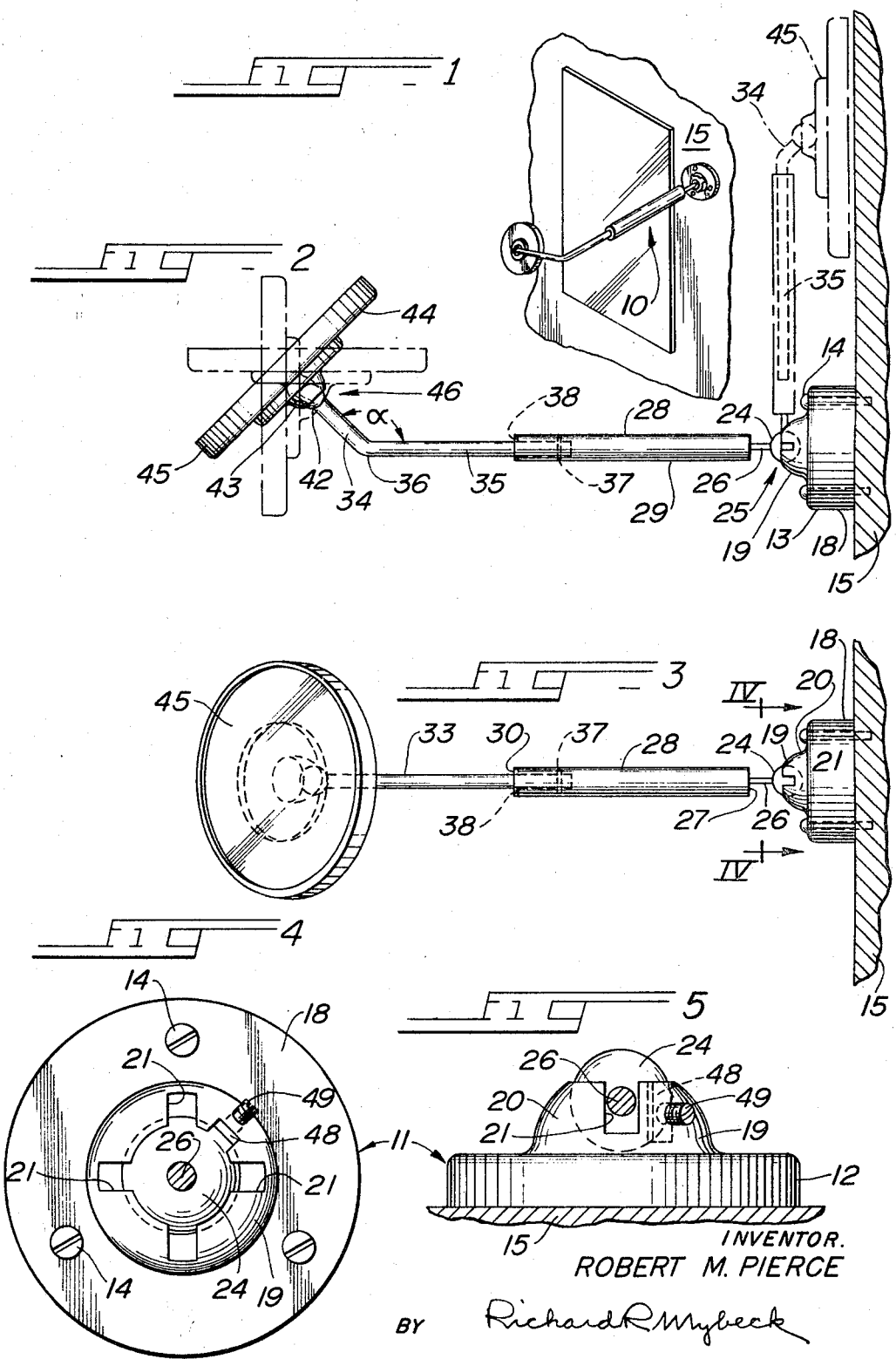
INVENTOR.
ROBERT M. PIERCE
BY Richard R. Mybeck
ATTY.

United States Patent Office
3,392,950
Patented July 16, 1968

3,392,950
ADJUSTABLE MIRROR ASSEMBLY
Robert M. Pierce, 214 E. Greenwood,
Crown Point, Ind. 46307
Filed June 27, 1966, Ser. No. 560,730
10 Claims. (Cl. 248—279)

ABSTRACT OF THE DISCLOSURE

An adjustable, extendible and foldable mirror assembly which is especially suited for use in personal grooming. Movement is obtained by a novel combination of coacting ball-and-socket joints with a pair of axially extendible arms. One of the arms has a portion in special angular relationship to an adjacent portion. The assembly may be utilized on a variety of surfaces and may be folded flat against such surfaces when not in use.

---

The present invention relates generally to an adjustable mirror assembly and more particularly to a mirror assembly which may be used independently of or in conjunction with other mirrors and provides adjustability which permits the user, by a single movement, to obtain any desired position or angle for the mirror, relative to any vertical or horizontal location.

It is generally well-known that milady is even conscious of her personal appearance and is particularly concerned with her grooming, expecially her hair. Consequently, she will make great use of mirrors. But in grooming or working with hair or other cosmetic work, it is frequently desirable and more frequently imperative to not only have an auxiliary mirror for use with the vanity mirror found normally in bathrooms or dressing rooms but to have such a mirror which may be easily positioned in an operative position and when so positioned, will not require the user's hands to maintain its position so that the hands are freed for occupation in connection with the grooming.

The prior art has concerned itself with the problem for many years, for instance see Obermiller U.S. Patent No. 760,478, May 24, 1904, and while progress has been made toward freeing the user's hands, the devices so developed have inevitably required several independent adjustments (see Conning et al., U.S. Patent No. 1,129,960, Mar. 2, 1951 and Bourdon, U.S. Patent No. 1,630,777, May 31, 1927) in order to achieve a desired locus for the mirror. When milady is desirous of inspecting her coiffure from several different angles, which is the rule, not the exception, then the gross inconvenience of the multi-movement designs becomes magnified and their general unacceptability driven home.

Additionally, the prior art devices, even as late as Butts U.S. Patent No. 2,915,944, Dec. 8, 1959, were of themselves unattractive and even offensive when not in use and possessed no convenient mode, short of detaching them and hiding them in a closet or cupboard, for withdrawing them from an otherwise ominous presence.

The present invention is predicated upon my development of a novel and unique design for an adjustable mirror assembly of the type described which not only succeeds in obtaining the advantages of the prior art devices, it successfully obviates their many shortcomings. More particularly, I have succeeded in creating a new and improved adjustable mirror assembly which not only completely frees the user's hands for the more pressing task of grooming, it is readily and easily relocated by simple direct movement into any desired position during use and readily collapsed into a compact unobtrusive unit when not in use. That I achieve by a novel combination of support means, a mirror, axially extensible arms, one of which has its portions disposed in a special angular relationship to each other, and a pair of universally pivotal ball and socket joints. More particularly, I have developed an adjustable mirror assembly in which support means, having a specially formed generally spherical slotted socket defined therein, coacts with a ball member carried by a tubular unit to define a ball-and-socket joint and provide substantially universal pivotal movement therebetween; and in which a mirror, having a ball receiving socket defined on a surface thereof, coacts with a ball member carried by an arm member to define a second ball-and-socket joint and provide substantially universal pivotal movement therebetween; and in which the arm member has adjacent portions disposed in angular relationship to each other, one of those portions being telescopically arranged with the tubular unit for axial and rotational movement relative thereto.

Accordingly, a prime objective of the present invention is the provision of an easily maneuvered adjustable mirror assembly which provides the person using the mirror substantially complete freedom for his hands.

Another object of the present invention is to provide an adjustable mirror assembly which is axially extensible from its supporting surface and which may be readily located or relocated in any desired position by simple direct movement.

A further object of the present invention is provision of an adjustable mirror assembly which when not in use may easily be moved into an unobtrusive position adjacent its supporting surface, and which may be used in connection with a ceiling, a wall, or furniture in any room of the house but is especially useful in a bathroom or dressing room.

A still further object of the present invention is the provision of a mirror assembly which is adjustable simultaneously relative to its x, y and z axes.

Still another objective of the present invention is the provision of an adjustable mirror assembly which may be attached to a wall or ceiling surface in a proximity to a vanity mirror and may be readily adjusted from that position by resultant movement to provide with the cooperating mirror a reflection of an obverse portion of the user's body for the user engaged in a grooming operation therewith.

Still another object of the present invention is the provision of an adjustable mirror assembly including an angularly disposed arm portion having universally pivotal ball and socket arrangements at each end thereof for enhancing adjustability of the mirror from position to position.

These and still further objects, as shall hereinafter appear, are readily fulfilled by the present invention in a remarkably unexpected fashion as will be readily discerned from a careful consideration of the following detailed description of exemplary embodiments thereof, especially when considered in conjunction with the accompanying drawing in which:

FIG. 1 is a fragmentary showing an adjustable mirror assembly embodying the present invention mounted in cooperative relationship with a conventional vanity mirror;

FIG. 2 is a side elevation of the mirror assembly of FIG. 1 and shows, in phantom, aspects of its adjustability including rotation into a retracted position relative to a vertical supporting surface;

FIG. 3 is a plan view of the assembly of FIG. 2;

FIG. 4 is a cross section taken along line IV—IV of FIG. 3; and

FIG. 5 is a side elevation of support means of the mirror assembly on a horizontal supporting surface when the assembly is in the "at rest" position.

Referring to the drawing in which like numerals indicate like parts throughout the several views, my novel mirror assembly is indicated by general reference 10 and comprises a support means 11 which may be weighted base 12, as shown in FIG. 5, for use on a vanity top and the like, or a bracket 13 attachable by suitable fastening means such as screws 14 to a suitable supporting surface 15 such as a wall or ceiling or molding. Support 11 comprising a body portion 18 and a centrally protruding portion 19 having a generally spherical socket 20 is defined therein. Portion 19 is provided with at least one and, preferably, a plurality of slots 21 in the outer surface thereof which define, geometrically, a segment of an arc on a great circle thereof. Great circle as used herein in its normal geometric sense, that is, it is a circle defined by cutting a sphere with a plane which passes through its center.

A suitable ball member 24 coacts with the socket 20 to provide universally pivotal ball and socket joint 25. A fixed shaft member 26 extends radially from ball members 24 and is joined at 27 to the closed end of a tubular body portion 28. For purposes of this description, ball 24, shaft 26, and body portion 28 will be considered as "tubular unit" 29.

Preferably, shaft 26 is disposed symmetrically with body portion 28 and extends axially therefrom into integral engagement with ball member 24. The end of portion 28 remote from ball member 24 is provided with an open mouth portion 30, the function of which will be later described.

Arm member 33 comprises a first portion 34 and a second portion 35 joining in an elbow 36. Portions 34 and 35 define an obtuse angle α at elbow 36 which, preferably, is from about 120° to about 150° and, desirably, is about 135°.

Arm portion 35 is telescopically arranged with tubular member 29 to permit relative axial movement therebetween.

While in the embodiment illustrated (see FIGS. 1, 2 and 3), arm portion 35 is shown inserted within tubular body portion 28, body portion 28 can be insertable within arm portion 35 without any disadvantage arising. Regardless of which relationship is convenient to the manufacture of the assembly, a suitable detent arrangement, such as is illustrated by outwardly extending protrusion 37, defined on the inserted member 35, and inwardly extending protrusion 38, defined on the inner surface 39 of the outer or receiving member 28, is desired to prevent the unexpected separation of the members during use.

If desired, the inserted member can be notched and a spring bias associated with mouth 30 to prevent the withdrawal of the inserted member therefrom or any other suitable detent means may be employed depending on the exigencies of the particular situation.

In any event, it is apparent that the arrangement enables the inserted member, such as arm portion 35, to move both axially and rotationally relative to the member into which it is inserted.

At the end of arm portion 34 remote from the tubular unit 29 a second ball member 42 is provided which coacts with a ball receiving socket 43 defined in the back portion 44 of a suitable mirror 45 to define a second universally pivotal ball and socket joint 46. Mirror 45 may be made to any desired configuration and is shown as circular for purposes of illustration only.

Thus constructed, my assembly may be placed in operation by setting it on a dresser or vanity, using weighted base 12, or by fastening to a ceiling, a wall, furniture molding, or any other suitable supporting surface by using bracket 13. When bracket 13 is used, my installation is effected by tightening fastening means 14 and thereby rigidly mounting the bracket 13 onto the surface 15. With ball members 24, 42 cooperatively engaged within ball receiving sockets 20, 43, respectively, and arm member 33 telescopically arranged with tubular unit 29, which in turn is supported by the shank member 26 interconnecting it and ball member 24, the assembly is ready for use simply by gripping mirror 45 and drawing it with a simple direct straight line movement to the desired position.

This simple and single action of the user's hand enables the mirror, by virtue of its unique design, to be drawn a desired distance from its supporting surface and into desired angle therewith. Thus, the single motion simultaneously causes such axial and rotational movement of arm member 33 relative to tubular member 29 and such pivoting in ball and socket joints 25, 46, as may be necessary to obtain the desired reflective relationship between the image in the mirror and the eyes of its user, either via a stationary mirror with which it may be associated or not.

When the user has completed grooming and is through using the mirror for the moment, it is usually desirable to place the mirror in a relatively inconspicuous position. Again, only a single movement is required to simultaneously cause arm member 33 to advance into tubular member 29 its full limit while pivoting tubular member 29 in ball and socket joint 25 into substantial parallel relationship to the supporting surface 15 by the engagement of shank 26 in any slot 21 defined in protruding portion 19.

While in normal use the universal pivot joints 25, 46 maintain sufficient friction to hold my assembly in the desired position, I have found it helpful when mounting my assembly to a vertical surface, such as a wall and the like, to provide a bearing plate 48 which coacts with a surface of ball member 24 in response to suitable actuating means such as screw 49 to create additional friction to resist any unwanted movement in response to gravity or when the assembly is in a fully extended condition.

From the foregoing it becomes readily apparent that a device has been herein described and illustrated which fulfills all of the aforementioned objectives to a remarkably unexpected extent. It is of course understood that the embodiments herein described and illustrated are presented to illustrate the invention rather than limit it and such modifications, variations and alterations as may readily occur to the artisan when confronted with this specification are intended included within the spirit of the present invention, especially as is defined by the scope of the claims appended hereto.

What I claim is:

1. An adjustable mirror assembly comprising support means having a generally spherical socket defined therein, said socket having at least one slot defined therein on an arc of a great circle; a tubular unit having a first ball member at one end thereof, said first ball member being inserted in and coacting with said socket to provide said tubular unit with substantially universal movement relative thereto; an arm member having a first portion telescopically arranged with said tubular unit for axial and rotational movement relative thereto and a second portion integrally formed with said first portion and defining an obtuse angle therewith, said second portion having a second ball member disposed upon the end thereof remote from said first portion; and a mirror carrying a ball receiving socket on the rear surface thereof engaging said second ball member and coacting therewith to provide universally pivotal relationship of said mirror relative to said arm portion, said mirror being usable in any selected position of extension and foldable to a relatively flat position adjacent a supporting surface when not in use.

2. An assembly according to claim 1 in which said obtuse angle is from about 120° to about 150°.

3. An assembly according to claim 1 in which said support means comprises a base having a body portion and a centrally protruding portion, said protruding portion having said socket defined therein for receiving and coacting with said first ball member to define a universal joint therewith.

4. An assembly according to claim 3 in which said base comprises a bracket and means for attaching said bracket to a supporting surface.

5. An assembly according to claim 1 in which said tubular unit has means at one end thereof for receiving and holding said arm member in telescopic relationship therewithin.

6. An assembly according to claim 1 in which said tubular unit has a tubular body portion, a shaft portion and said first ball member at an end thereof, said shaft portion extending axially from said tubular body portion into supporting engagement with said ball member.

7. An assembly according to claim 3 in which said support means is adapted to engage a supporting surface and said protruding portion is generally spherical and said slot is defined therein on an arc of a great circle for receiving therein a portion of said tubular unit when said tubular unit is turned into substantially parallel relationship with said supporting surface.

8. An assembly according to claim 7 in which said tubular unit has a tubular body portion, a shaft portion and a ball member at an end thereof, said shaft portion extending axially from said tubular body portion into supporting relationship with said first ball member and, when said tubular unit is turned into substantially parallel relationship with said supporting surface, entering into engagement with said slot.

9. An assembly according to claim 4 in which said protruding portion is generally spherical and has a plurality of said slots defined therein each on an arc of a great circle thereof for receiving therein a portion of said tubular unit when said tubular unit is turned into substantially parallel relationship to said supporting surface.

10. An assembly according to claim 1 in which said support means comprises a weighted base having said socket defined thereupon and coacting with said first ball member to define a universally pivotal joint therewith.

References Cited

UNITED STATES PATENTS

| | | | |
|---|---|---|---|
| 357,299 | 2/1887 | Wright | 248—181 |
| 538,534 | 4/1895 | Neill | 248—181 XR |
| 1,806,059 | 5/1931 | Hoople | 248—484 XR |
| 2,763,188 | 9/1956 | Bertell | 248—484 |
| 2,802,395 | 8/1957 | Madion | 248—480 |
| 3,096,061 | 7/1963 | Bertell | 248—288 |
| 3,205,777 | 9/1965 | Brenner | 248—480 |

JOHN PETO, *Primary Examiner.*